US010579626B2

(12) United States Patent
DiTomaso et al.

(10) Patent No.: US 10,579,626 B2
(45) Date of Patent: Mar. 3, 2020

(54) SYSTEM AND METHOD FOR BAYESIAN MATCHING OF WEB SEARCH RESULTS

(71) Applicants: Joseph DiTomaso, New York, NY (US); William Beckler, New York, NY (US)

(72) Inventors: Joseph DiTomaso, New York, NY (US); William Beckler, New York, NY (US)

(73) Assignee: ALL THEROOMS, New York, NY (US)

( * ) Notice: Subject to any disclaimer, the term of this patent is extended or adjusted under 35 U.S.C. 154(b) by 704 days.

(21) Appl. No.: 15/271,401

(22) Filed: Sep. 21, 2016

(65) Prior Publication Data

US 2018/0081949 A1    Mar. 22, 2018

(51) Int. Cl.
*G06F 16/2457*      (2019.01)
*G06N 7/00*      (2006.01)
*G06F 16/248*      (2019.01)
*G06F 16/951*      (2019.01)

(52) U.S. Cl.
CPC ...... *G06F 16/24575* (2019.01); *G06F 16/248* (2019.01); *G06F 16/951* (2019.01); *G06N 7/005* (2013.01)

(58) Field of Classification Search
CPC ............. G06F 16/24575; G06F 16/951; G06F 16/248; G06N 7/005
USPC ........................................................ 707/722
See application file for complete search history.

(56) References Cited

U.S. PATENT DOCUMENTS

| | | | | |
|---|---|---|---|---|
| 7,359,898 | B1 * | 4/2008 | Acton | G06F 16/24578 707/999.003 |
| 8,005,823 | B1 * | 8/2011 | Marshall | G06F 16/2455 707/721 |
| 8,219,558 | B1 * | 7/2012 | Trandal | G06Q 10/087 707/736 |
| 8,732,222 | B2 * | 5/2014 | Horvitz | G06N 5/043 707/899 |
| 10,013,699 | B1 * | 7/2018 | Pope | G06Q 30/0214 |
| 2004/0024777 | A1 * | 2/2004 | Schaffer | H04H 60/46 707/999.103 |
| 2007/0112734 | A1 * | 5/2007 | Xin | G06F 16/951 707/E17.108 |
| 2008/0183700 | A1 * | 7/2008 | Gabriel | G06F 16/951 707/E17.108 |
| 2009/0018965 | A1 * | 1/2009 | Neydavood | G06Q 30/02 705/80 |

(Continued)

*Primary Examiner* — Phong H Nguyen
(74) *Attorney, Agent, or Firm* — Buckley, Maschoff & Talwalkar LLC (57) ABSTRACT

Provided are a system and method for matching search results from multiple websites. In one example, the method includes calculating a probability that a search result of a first website corresponds to a same item as a search result of a second website based on Bayes theorem, in response to the calculated probability being greater than a predetermined threshold, determining that the search result of the first website and the search result of the second website are a match, and displaying an aggregated list of search results combined from the first website and the second website based on the matched search results. By auto-matching search results using Bayes theorem, a true match can be determined that is more accurate in comparison to a manual matching operation performed by a human.

19 Claims, 4 Drawing Sheets

(56) References Cited

U.S. PATENT DOCUMENTS

| | | | |
|---|---|---|---|
| 2014/0351091 A1* | 11/2014 | He | G06Q 30/0625 705/26.62 |
| 2015/0347519 A1* | 12/2015 | Hornkvist | G06F 16/2457 707/722 |
| 2016/0246791 A1* | 8/2016 | Long | G06F 16/9535 |
| 2017/0221239 A1* | 8/2017 | Lintz | G06T 11/206 |

* cited by examiner

SYSTEM AND METHOD FOR BAYESIAN MATCHING OF WEB SEARCH RESULTS

BACKGROUND

Various search engines and comparison websites compare web content associated with an item, often for purchase, from multiple sources and provide a requesting user with a comparison of attributes of the item from the web content, for example, a price comparison, feature comparison, availability comparison, and other features. One industry where such comparisons often take place is in the retail industry where web visitors can filter and compare attributes of items such as products, services, hotel accommodations, flights, and the like. To provide the viewer with a comparison of the same item from multiple websites, a comparison site typically collects web content from multiple websites and stores the collected web content in a large centralized database. An engineer of the database (e.g., a manager, operator, technician, etc.) then attempts to manually match web content associated with the item together from multiple websites. For example, the engineer may compare search results on a first website to search results on a second website to determine if the two search results correspond to the same item (e.g., product, service, hotel listing, flight accommodations, or the like). When each site has a respective search result corresponding to the same item, the search results are determined to be a match, and the web content associated therewith may be compared with each other or one of the search results may be removed to provide a consolidated lists of search results from the combined search results of both sites.

However, one of the drawbacks of manually determining that search results are associated with the same item is that human error can cause mistakes in the matching process or fail to identify matches. For example, a human may fail to identify or incorrectly identify that a hotel listing on a first website corresponds to a hotel listing on a second website, because of a difference between one or more attributes such as the hotel name, address, geo-location, and the like, between the search results/listings on the two sites. Another drawback is the amount of time that it takes the engineer to manually view web content associated with search results from across multiple websites and determine which search results are for die same item. As a non-limiting example, for a single hotel comparison on a travel related website, the website may collect a price for the hotel from twenty different hotel related websites in order provide one comprehensive price comparison search result of hotel. To gather web content associated with the hotel from those twenty sites, the engineer must first match twenty search results from these twenty sites through a manual process.

Accordingly, what is needed is an automated system for matching web content from multiple websites and databases, which does not require a manual matching process and which is immune from or has a reduced possibility of human error.

SUMMARY

According to an aspect of an example embodiment, provided is a method for matching search results from multiple websites, the method including calculating a probability that a search result of a first website corresponds to a same item as a search result of a second website based on Bayes theorem, in response to the calculated probability being greater than a predetermined threshold, determining that the search result of the first website and the search result of the second website are a match, and displaying an aggregated list of search results combined from the first website and the second website based on the matched search results.

According to an aspect of another example embodiment, provided is a computing device for matching search results from multiple websites, the computing device including a processor configured to calculate a probability that a search result of a first website corresponds to a same item as a search result of a second website based on Bayes theorem, and, in response to the calculated probability being greater than a predetermined threshold, determine that the search result of the first website and the search result of the second website are a match, and an output configured to output, to a display device, an aggregated list of search results combined from the first website and the second website based on the matched search results.

According to an aspect of another example embodiment, provided is a non-transitory computer readable medium having stored therein instructions that when executed cause a computer to perform a method for matching search results from multiple websites, the method including calculating a probability that a search result of a first website corresponds to a same item as a search result of a second website based on Bayes theorem, in response to the calculated probability being greater than a predetermined threshold, determining that the search result of the first website and the search result of the second website are a match, and displaying an aggregated list of search results combined from the first website and the second website based on the matched search results.

Other features and aspects may be apparent from the following detailed description, the drawings, and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

According to various embodiments, provided herein is a system and method for matching web content from across multiple websites using Bayes theorem. In particular, a search result from a first website may be matched to a search result from a second website (i.e., identified as being associated with a same item) using Bayes theorem. For example, the matching may be performed by a host computer of a search engine site or a comparison site that may provide an aggregated list of search results from multiple websites or provide a comparison of content (e.g., price) from multiple websites within a unified search result. For example, a search result from a first website may be compared with a search result from a second website to determine whether the two search results correspond to the same item, thing, product, hotel listing, service, and the like. When the two search results are determined to be a match to the same item, the host may perform deduplication of the matched search results such that only one search result is provided within an aggregated list of search results or the host may generate a comparison of the web content from the matched search results. The host may also display search results based on the matching.

Related comparison sites and search engines typically require a human to perform matching of search results from different websites. In other words, a human must take the time to visually compare a first search result on a first website to a second search result on a second website and make a determination (or guess) as to whether the two search results are for the same item. As a result, there is often human error in the matching process or a failure by the human to detect two search results as being the same given the massive amount of data involved. Some related sites are capable of automatically detecting that a search result of a first website is a duplicate of a search result of a second website if the web content included in the two search results is a perfect match with the one another. However, if there is a difference between any of the name of an item, address, description, etc., of two search results (even though the search results refer to the same item, product, hotel, etc.), the automated matching process is not able to match the two search results. As a result, automated matching in a related art does not provide any room for differences (or mistakes) between search results no matter how minor.

According to various aspects, matching between two search results of web content may be performed using Bayesian matching. In testing performed by the inventors, a training set of correctly matched hotel rental comparisons (e.g., 10,000 matched hotel listings) was built. The matched set was analyzed and determined to have a range of distribution in the accuracy level of matching hotel search results. In other words, not all matching hotel listings were a perfect match with each other. Bayes theorem was applied to the search results of the hotel listings to identify a statistically optimal solution of what hotel listings are a match even in cases where the listings were not an identical match. Using a plurality of dimensions or factors such as geolocation, hotel names, words/numbers in the address, amenities, star ratings, and the like, the example embodiments identify the Bayesian prior and combine the probabilities in a mathematically optimal way to get the best possible answer. The Bayesian matching is performed by a computer/processor and has shown to be more accurate than human-powered classification. That is, when human matched search results on test data strayed from the Bayesian matched search results during testing of the same data, it was because the human matched results were incorrect.

Figure 1:
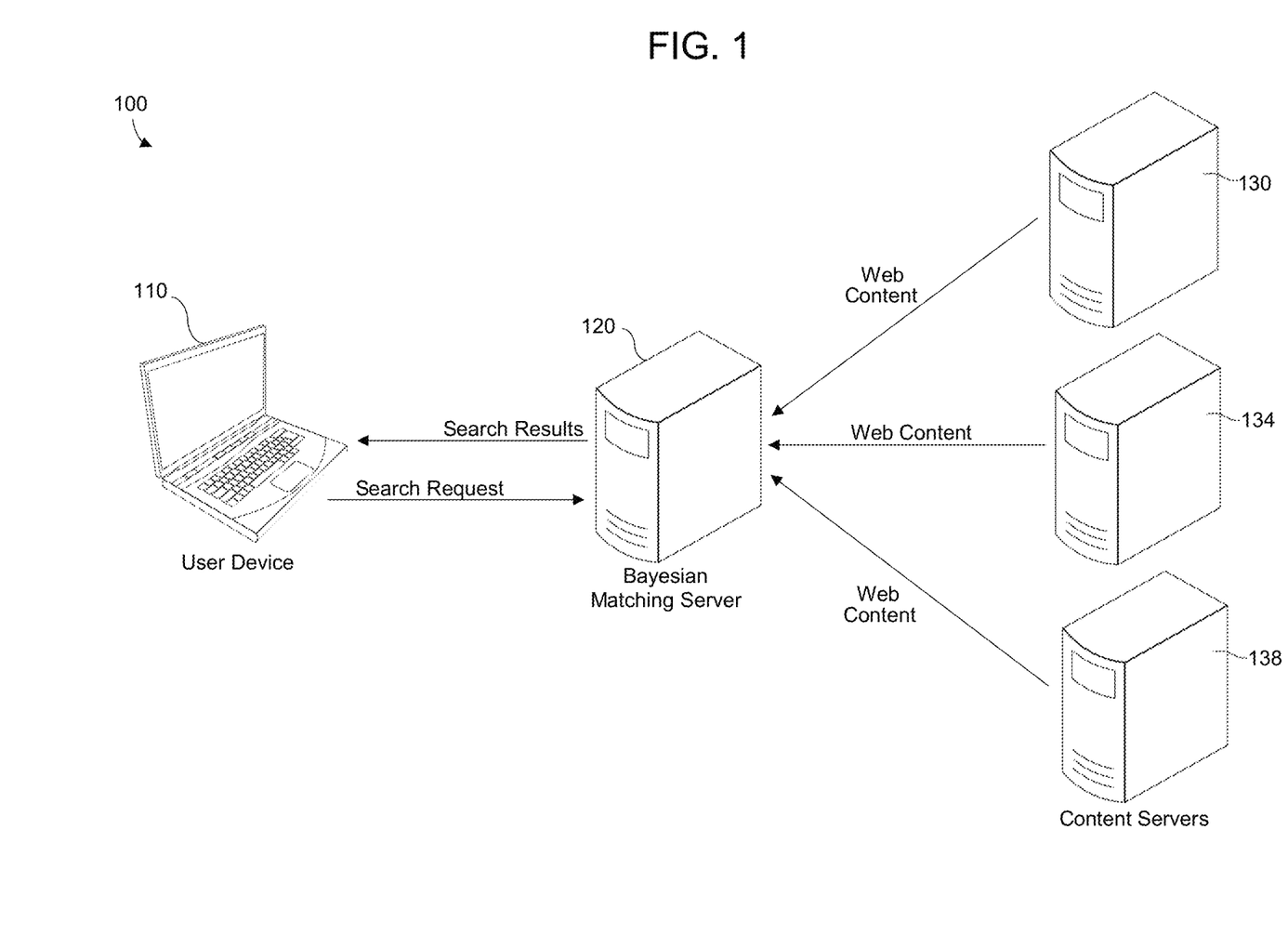
FIG. 1 is a diagram illustrating a system for Bayesian matching of search results from multiple sources in accordance with an example embodiment.

FIG. 1 illustrates a system 100 for Bayesian matching of search results from multiple sources in accordance with an example embodiment. Referring to FIG. 1, the system 100 includes a user device 110, a Bayesian matching server 120, and a plurality of content server 130, 134, and 138. The components of the system 100 may be connected to each other through a network such as the Internet, a private network, or a combination thereof. Also, the network may be a wired network, a wireless network, or a combination thereof. The user device 110 may be, for example, a computer, a laptop, a notepad, a tablet, a mobile device, a smart wearable device, an appliance, a kiosk, a television, and the like. The Bayesian matching server 120 may be a web server that hosts one or more websites and/or that is connected to one or more host servers hosting websites. The plurality of content servers 130, 134, and 138 may each host one or more respective websites and may have content stored therein associated with the websites.

In an example operation, the user device 110 may connect to the Bayesian matching server 120 when a user inputs an address of a website hosted by the Bayesian matching server 120 into a web browser executing on the user device. For example, the web browser may be Microsoft Internet Explorer, Apple Safari, Google Chrome, and the like. As another example, the web browser may be a mobile browser in a case in which the user device 110 corresponds to a mobile device, tablet, smart wearable device, etc. The user device 110 may request the Bayesian matching server 120 for a search request (e.g., keyword search) corresponding to a product, service, hotel listing, travel accommodation, and the like. In response, the Bayesian matching server 120 may perform a search operation across the Internet and gather search results from a plurality of websites hosted by the plurality of content servers 130, 134, and 138, based on the search request. The Bayesian matching server 120 may collect search results from respective websites hosted by the plurality of content servers 130, 134, and 138 based on the search request.

In the example of FIG. 1, the Bayesian matching server 120 may host a website such as a search engine, a comparison site, a content providing site, and the like. The Bayesian matching server 120 may be connected to the plurality of content servers 130, 134, and 138, and collect web content from across the content servers 130, 134, and 138 (e.g., from websites hosted by the content servers 130, 134, and 138). For example, the Bayesian matching server 120 may collect retail content, travel related content, news related content, entertainment content, and the like, from across the multiple content server 130, 134, and 138. For convenience of explanation, some examples herein refer to travel related web content such as vacation rentals, vacation home rentals, hotel accommodations, and the like, however, it should be appreciated that other types of web content may be used such as retail web content, news content, medical content, entertainment content, and the like, without any difference in the function of the system and methods.

According to various embodiments, the Bayesian matching server 120 may provide search results from the plurality of content servers 130, 134, and 138 to the user device 110 based on matched search results in response to a search request input by a user. For example, the Bayesian matching server 120 may provide an aggregated list of search results or a comparison of search results from the plurality of websites to the user device 110. In order to generate an aggregated list of search results that is potentially easier and more efficient for a user to view and navigate through, the Bayesian matching server 120 may match two search results from two respective websites that correspond to a same unique item (e.g., product, service, hotel accommodation) and remove redundant search results. That is, the Bayesian matching server 120 may perform deduplication such that only a single instance of a search result for that particular item is included in the aggregated list of search results instead of multiple instances. As another example, the Bayesian matching server 120 may match search results corresponding to the unique item from multiple websites, extract content from the search results, and provide a single unified search result for the item with content included from multiple sites and multiple search results such as a plurality of prices, availability, different features, and the like.

Rather than perform a manual matching operation, the Bayesian matching server 120 according to example embodiments can automatically match search results (e.g., auto-match) based on Bayes theorem. For example, one or more features from web content of a first search result and one or more features from web content of a second search result may be compared using Bayes theorem to determine if the two search results, and the respective web content, correspond to the same unique search result (i.e., item). In an example of comparing two rental property listings as the two search results, one or more of a name, an address, a geolocation, a rating, amenities, and the like, of the two respective rental properties may be compared with each other using Bayes theorem to determine if the two rental property listings are for the same piece of property. In this case, the Bayes theorem may be used to calculate a probability that the two rental property listings (e.g., hotel, vacation rental, etc.) correspond to the same property based on corresponding web content of the rental property listings. According to various embodiments, if the probability that the two search results correspond to the same unique item is above a predetermined threshold, the two search results may be determined as being directed towards the same item. Furthermore, the Bayesian matching server 120 may generate a list of search results based on the matching, for example, by removing redundant search results, comparing search results for a same item, and the like, based on the determined matching search results. In the example of FIG. 1, the Bayesian matching server 120 may provide the search results to the user device 110 such as through a web browser executing on the user device 110.

Figure 2:
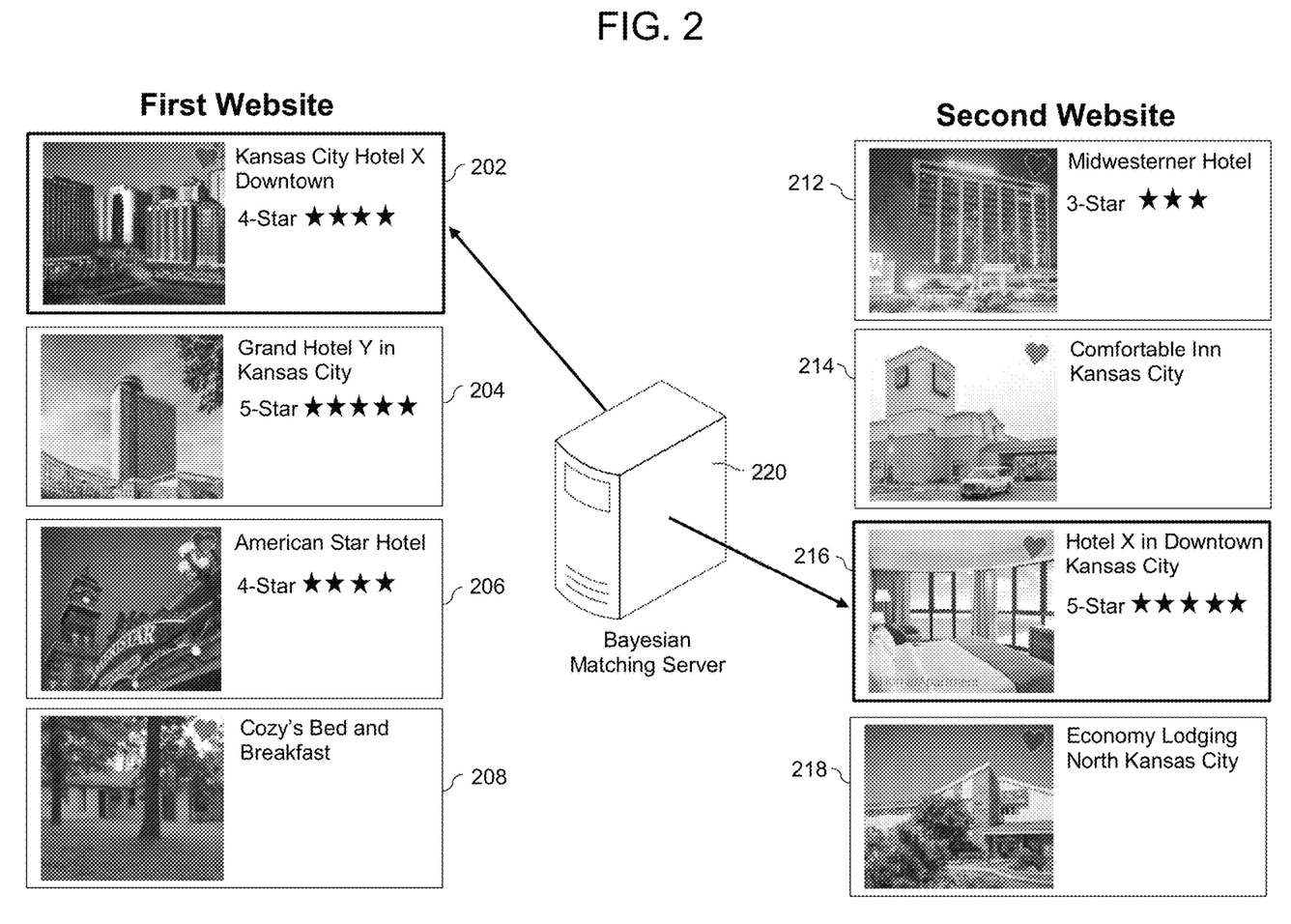
FIG. 2 is a diagram illustrating a process of matching search results from multiple websites in accordance with an example embodiment.

FIG. 2 illustrates a process of matching search results from multiple websites in accordance with an example embodiment. For example, the process illustrated in the example of FIG. 2 may be performed by the Bayesian matching server 120 shown in FIG. 1 using search results collected from contents servers such as content servers 130, 134, and 138. In this example, a plurality of search results 202, 204, 206, and 208 from a first website are received and a plurality of search results 212, 214, 216, and 218 are received from a second website. In this non-limiting example, the search results from the first website include a first list of rental properties and the search results from the second website include a second list of rental properties. For example, the search results 202-208 and 212-218 from both the first website and the second website may be the results from a search request for a hotel or rental listing in a particular area (e.g., city, town, neighborhood, zip code, state, and the like) input into a search bar of a website hosted by the Bayesian matching server 220 or hosted by another computing device. The Bayesian matching server 220 may then perform a search on the first and second websites using the same search request, and a plurality of search results 202-208 and 212-218 may be provided.

According to various embodiments, a search result of a first website and a search result of a second website may correspond to the same unique product, item, hotel listing, or the like, however, the web content associated with the two search results may not be an exact match with each other for one or more reasons. For example, one or more of a name, description, features, amenities, geolocation, address, and the like, may be different between two search results for two hotel listings or vacation property rental listings on two different websites. In the example of FIG. 2, search result 202 of the first website corresponds to the same unique rental property listing as search result 216 of the second website, however, both the name of the rental property and the rating of the rental property are different on the respective site, and therefore not a perfect match with one another. Therefore, according to various embodiments, web content from the search result 202 may be input into Bayes theorem along with web content from the search result 216, to determine the probability that the two search results 202 and 216 correspond to the same rental property.

Many websites perform comparison of items, products, travel accommodations, and the like. For example, a user can search websites for finding the cheapest price on books, cars, hotels, consumer electronics, services, and the like. However, the matching process for matching search results together is typically performed manually by a human or a matching process that requires a perfect match. In the example of FIG. 2, it is not obvious from viewing search result 202 and search result 216 that the two search results correspond to the same unique hotel listing because the hotels are named differently, have different review ratings, and have different representative images on the respective websites. As a result, it is difficult for a user to manually detect that the two search results 202 and 216 correspond to the same rental property listing. Furthermore, there are over one million hotels available globally. Everyday there are hundreds of hotels opening and hundreds of hotels closing all around the world. As a result, websites are always adding and removing hotels from the pool of returnable search results. Therefore, a website may provide search results for over a million hotel accommodations. Sifting through the data, manually, can be an exhaustive process.

To eliminate these problems, the example embodiments use Bayes theorem in an automated process to determine a probability (e.g., a likelihood) that the two search results 202 and 216 are to the same unique rental property listing. By using Bayes theorem instead of requiring a perfect match, the example embodiments can provide wiggle room between web content of two search results while still auto-matching two search results corresponding to the same item. For example, one or more of a geolocation, a description, keywords and/or numbers from an address, keywords from a name, and the like, of the two respective rental properties may be input into Bayes theorem, and results thereof may be combined, to determine if the two rental property listings have a probability of corresponding to the same rental property. In this example, the probability that the two search results 202 and 216 are for the same unique hotel listing is determined to be above a predetermined threshold even though various web content features are not an identical match. Accordingly, the Bayesian matching server 220 determines that search result 202 and search result 216 match the same rental property.

Figure 3:
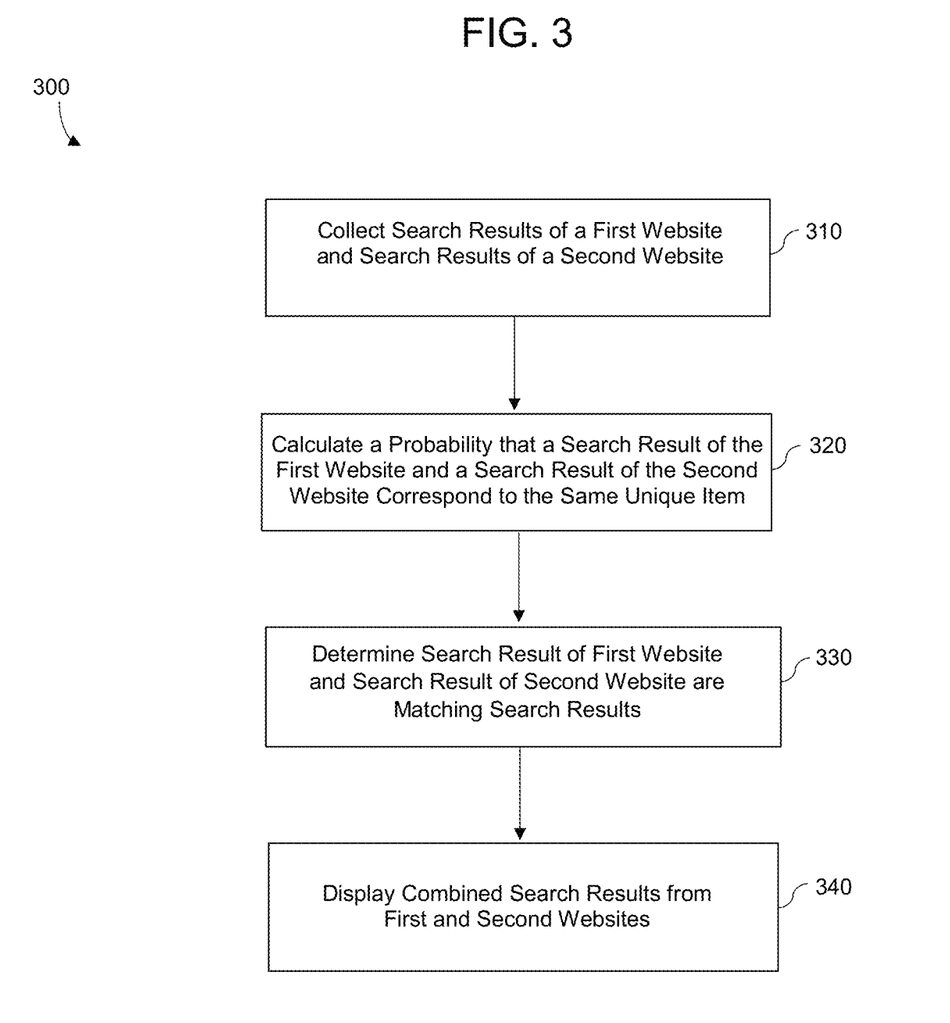
FIG. 3 is a diagram illustrating a method for matching search results in accordance with an example embodiment.

FIG. 3 illustrates a method 300 for matching search results from multiple websites in accordance with an example embodiment. For example, the method 300 may be performed by the Bayesian matching server 120 or 220 shown in FIG. 1 or 2. Referring to FIG. 3, in 310, the method includes collecting search results from a plurality of sources including at least a first website and a second website. For example, the search results may be received from host servers hosting the first and second websites, respectively. The search results may be received in response to a search request being input by a user of a user device that is connected to the Bayesian matching server. In 320, the method further includes calculating a probability that a search result of a first website corresponds to a same item as a search result of a second website based on Bayes theorem. For example, the calculating in 320 may include calculating the probability that the search result of the first website and the search result of the second website correspond to a same rental property listing, product, or service. As one example, a probability that a rental property listing of the first website corresponds to a same property as a rental property listing of the second website may be calculated based on Bayes theorem.

According to various embodiments, the probability may be calculated based on web content of the search result of the first website and web content of the search result of the second website being compared using Bayes theorem. For example, the probability may be calculated based on one or more attributes of the respective search results such as a name, an address, a geolocation, amenity information, ratings, and the like, of the rental property listings of the first and second websites being compared using Bayes theorem. Here, keywords from the names or keywords and numbers from the addresses may be input into Bayes theorem to determine a probability that the first and second search results are for the same item. Also, Bayes theorem may be used to find a plurality of probabilities based on a plurality of different attributes and the plurality of probabilities may be averaged or otherwise combined to determine whether the two search results are a match.

In 330, the method further includes, in response to the calculated probability being greater than a predetermined threshold, determining that the search result of the first website and the search result of the second website are a match. Furthermore, in 340 the method includes displaying an aggregated list of search results combined from the first website and the second website based on the matched search results. For example, the displaying may include displaying a comparison of web content from the search result of the first website with web content from the search result of the second website. As another example, the displaying may include displaying the search result from the first website within the aggregated list and excluding the search result from the second website from the aggregated list as being redundant as the search result from the first website.

Figure 4:
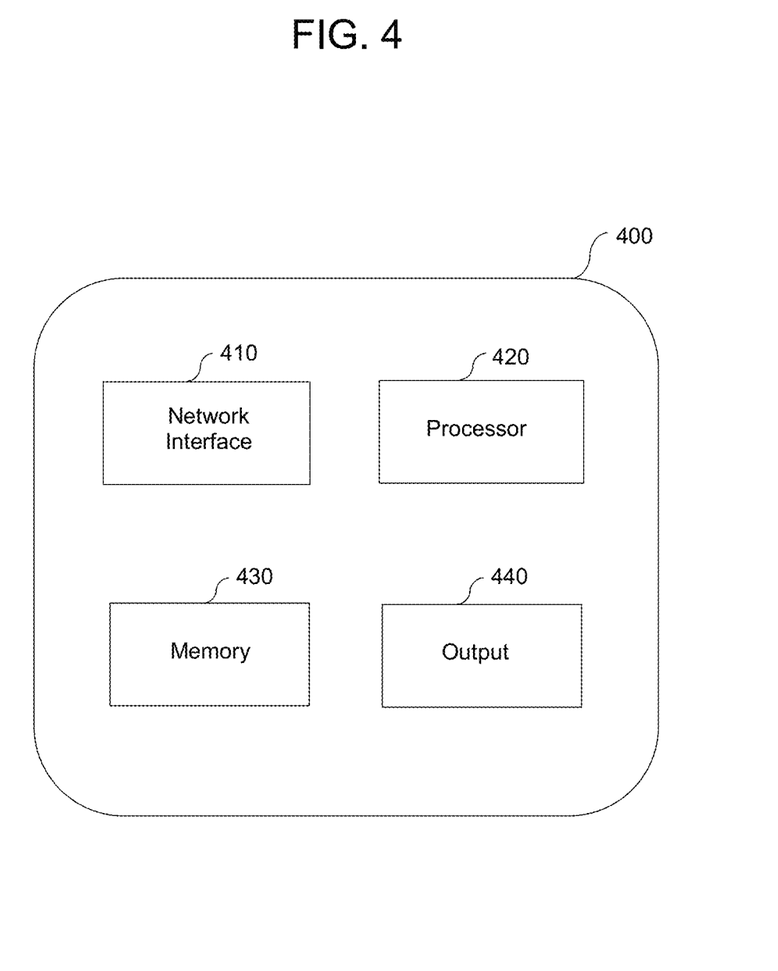
FIG. 4 is a diagram illustrating a computing device for matching search results in accordance with an example embodiment.

FIG. 4 illustrates a computing device 400 for matching search results from multiple websites in accordance with an example embodiment. For example, the computing device 400 may correspond to the Bayesian matching server 120 or 220 of FIG. 1 or 2, and may perform the method 300 of FIG. 3. Referring to FIG. 4, the computing device 400 includes a network interface 410, a processor 420, a memory 430, and an output 440. Although not shown in FIG. 4, the computing device 400 may include other components, for example, an input unit, a transmitter, a receiver, and the like. The network interface 410 may transmit and receive data over a network such as the Internet. For example, the network interface 410 may transmit and receive data to and from user devices, content servers, web servers, and the like. The processor 420 may include a single core processing device, a multicore processing device, or multiple processing devices. The processor 420 may control the overall operations of the computing device 400. The memory 430 may include any desired memory, for example, random access memory (RAM), one or more hard disks, cache, hybrid memory, an external memory, flash memory, and the like.

In the example of FIG. 4, the network interface 410 may receive or otherwise collect search results from a plurality of sources such as search results from a first website and search results from a second website. As an example, the search results may be collected or received from the first and second websites in response to a user query input on a third website (e.g., hosted by the computing device 400 or some other device), or input on one of the first or second websites. In some examples, the search results may be stored in the memory 430. The processor 420 may calculate a probability that a search result of a first website corresponds to a same item as a search result of a second website based on Bayes theorem. In response to the calculated probability being greater than a predetermined threshold, the processor 420 may further determine that the search result of the first website and the search result of the second website are a match. For example, the processor 420 may calculate the probability based on web content of the search result of the first website and web content of the search result of the second website being compared using Bayes theorem.

As a non-limiting example, the processor 420 may calculate the probability that the search result of the first website and the search result of the second website correspond to a same rental property listing, product, or service. That is, the processor 420 may calculate a probability that a rental property listing of a first website corresponds to a same property as a rental property listing of a second website based on Bayes theorem. In this example, the processor 420 may use one or more of a name, an address, a geolocation, features, amenities, ratings, and the like, of the rental properties as inputs into a Bayes theorem algorithm to determine a likelihood that the search result of the first website corresponds to a same rental property as a search result of a second website.

The output 440 may output, to a display device such as the display device of a user device through the Internet, an aggregated list of search results combined from the first website and the second website based on the matched search results. For example, the output 440 may output a display of a comparison of web content from the search result of the first website with web content from the search result of the second website. As another example, the output 440 may output the aggregated list on search results including the search result from the first website within the aggregated list and excluding the search result from the second website from the aggregated list as being redundant as the search result from the first website.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
   receiving, via a processor, a search request;
   extracting, via the processor, web content of search results of the search request that are retrieved from a plurality of websites including a first website and a second website;
   determining, via the processor, a probability that a search result of the first website corresponds to a same listing as a search result of the second website based on a comparison between values for predefined attributes of the search result of the first website and corresponding values for predefined attributes of the search result of the second website;
   in response to the determined probability being greater than a predetermined threshold, removing, via the processor, at least one of the search result of the first website and the search result of the second website from the search results corresponding to the search request to generate modified search results; and
   displaying, via the processor, the modified search results.

2. The method of claim 1, wherein the determining comprises determining the probability that the search result of the first website and the search result of the second website correspond to a same rental property listing, product, or service.

3. The method of claim 1, further comprising inputting extracted web content of the search result of the first website with extracted web content of the search result of the second website into a predefined theorem to generate the comparison.

4. The method of claim 1, wherein the determining comprises determining a probability that a rental property listing of the first website corresponds to a same property as a rental property listing of the second website based on a similarity between one or more of geolocation attributes and descriptive attributes extracted of the rental property listings from the first and second websites.

5. The method of claim 4, further comprising generating the comparison based on a name value of the rental property listing of the first website with respect to a name value of the rental property listing of the second website extracted from content of the rental property listings.

6. The method of claim 4, further comprising generating the comparison based on a geographic address of the rental property listing of the first website with respect to a geographic address of the rental property listing of the second website extracted from content of the rental property listings.

7. The method of claim 1, wherein the displaying comprises displaying a comparison of web content from the search result of the first website with web content from the search result of the second website.

8. The method of claim 1, further comprising extracting content from the search result of the second website and adding it to the search result of the first website to generate a unified search result for the first and second websites, wherein the displaying further comprises displaying the unified search result.

9. A computing device comprising:
   a network interface configured to receive a search request;
   a processor configured to
      extract web content of search results of the search request that are retrieved from a plurality of websites including a first website and a second website,
      determine a probability that a search result of the first website corresponds to a same listing as a search result of the second website based on a comparison between values for predefined attributes of the search result of the first website and corresponding values for predefined attributes of the search result of the second website, and
      in response to the determined probability being greater than a predetermined threshold, remove at least one of the search result of the first website and the search result of the second website from the search results corresponding to the search request to generate modified search results; and
   an output configured to output, to a display device, the modified search results.

10. The computing device of claim 9, wherein the processor is configured to determine the probability that the search result of the first website and the search result of the second website correspond to a same rental property listing, product, or service.

11. The computing device of claim 9, wherein the processor is further configured to input extracted web content of the search result of the first website and with extracted web content of the search result of the second website into a predefined theorem to generate the comparison.

12. The computing device of claim 9, wherein the processor is configured to determine a probability that a rental property listing of the first website corresponds to a same property as a rental property listing of the second website based on a similarity between one or more of geolocation attributes and descriptive attributes extracted of the rental property listings from the first and second websites.

13. The computing device of claim 12, wherein the processor is further configured to generate the comparison based on a name value of the rental property listing of the first website with respect to a name value of the rental property listing of the second website extracted from content of the rental property listings.

14. The computing device of claim 12, wherein the processor is further configured to generate the comparison based on an address of the rental property listing of the first website with respect to an address of the rental property listing of the second website extracted from content of the rental property listings.

15. The computing device of claim 9, wherein the output is configured to output a display of a comparison of web content from the search result of the first website with web content from the search result of the second website.

16. A non-transitory computer readable medium storing instructions that when executed cause a computer to perform a method comprising:
receiving a search request;
extracting web content of search results of the search request that are retrieved from a plurality of websites including a first website and a second website;
determining a probability that a search result of the first website corresponds to a same listing as a search result of the second website based on a comparison between values for predefined attributes of the search result of the first website and corresponding values for predefined attributes of the search result of the second web site;
in response to the determined probability being greater than a predetermined threshold, removing at least one of the search result of the first website and the search result of the second website from the search results corresponding to the search request to generate modified search results; and
displaying the modified search results.

17. The non-transitory computer readable medium of claim 16, wherein the method further comprises inputting extracted web content of the search result of the first website with extracted web content of the search result of the second website into a predefined theorem to generate the comparison.

18. The non-transitory computer readable medium of claim 16, wherein the determining the probability comprises determining a probability that a rental property listing of the first website corresponds to a same property as a rental property listing of the second website based on a similarity between one or more of geolocation attributes and descriptive attributes extracted of the rental property listings from the first and second websites.

19. The non-transitory computer readable medium of claim 16, wherein the method further comprises generating the comparison based on a name value of the rental property listing of the first website with respect to a name value of the rental property listing of the second website extracted from content of the rental property listings.

* * * * *